United States Patent

Berry et al.

[15] 3,644,242

[45] Feb. 22, 1972

[54] DIALLYL CARBONATE FILLED COMPOSITIONS

[72] Inventors: David A. Berry, Columbus; Gilbert M. Gynn, Hilliard, both of Ohio

[73] Assignee: Dart Industries Inc.

[22] Filed: Apr. 16, 1969

[21] Appl. No.: 816,794

[52] U.S. Cl.............260/17.4 CL, 260/22 CB, 260/23.5 R, 260/32.8 R, 260/40 P, 260/41 A, 260/41 AG, 260/41 B, 260/41 C

[51] Int. Cl..................................C08f 45/04, C08f 45/18

[58] Field of Search............260/17.4 CL, 41 A, 41 B, 41 C, 260/41 AG, 77.5 UA, 40 P

[56] References Cited

UNITED STATES PATENTS

| | | | |
|---|---|---|---|
| 2,437,962 | 3/1948 | Kropa | 260/78.5 |
| 2,449,804 | 9/1948 | D'Alelio et al. | 260/83 |
| 2,550,652 | 4/1951 | Drechsel et al. | 260/85.5 |
| 2,553,325 | 5/1951 | Loritsch | 260/78.5 |
| 2,580,901 | 1/1952 | Erickson et al. | 260/86.7 |
| 2,598,664 | 6/1952 | Kropa | 260/45.4 |
| 2,722,525 | 11/1955 | Price et al. | 260/77.5 |
| 3,230,187 | 1/1966 | Oldham | 260/6 |

*Primary Examiner*—William M. Short
*Assistant Examiner*—Louise P. Quast
*Attorney*—Ronald J. Carlson, Fred S. Valles and Richard A. Dannels, Jr.

[57] ABSTRACT

Compositions comprising diallyl carbonate polymers and at least a primary filler such as alpha cellulose, glass fibers, polyester fibers, and mixtures thereof have better stain resistance and better impact resistance and other strength properties than prior art compositions recognized as outstanding for use in dinnerware. The compositions can also contain such secondary fillers as clay, calcium carbonate, magnesium carbonate, silica powder and the like. They also have excellent hardness and resistance to chemical attack by alkali and detergents and have excellent high-temperature properties.

6 Claims, No Drawings

DIALLYL CARBONATE FILLED COMPOSITIONS

BACKGROUND OF THE INVENTION

1. Field of the Invention

This invention relates to compositions of matter containing a reinforcing filler. More particularly, it relates to the reinforcement of diallyl carbonate polymers by blending with a certain type of fibrous material such as cellulose, glass and polyester fibers to thereby improve certain specific physical properties making the diallyl carbonate polymers ideal for use in dinnerware and laminated tabletops.

Compositions of this invention find use in injection and compression-molded articles of thermosetting resins. The resulting articles have high heat resistance, high modulus of elasticity, high tensile strength, high impact strength, and excellent hardness, solvent resistance, and resistance to staining and particularly staining caused by coffee, tea, fruit and vegetable juices of all types, soft drinks and the like. Another important physical property possessed by the articles molded from the compositions of this invention is their very low wick effect, that is, their low ability to pick up color bodies through the porous edges left on the articles during the molding operation and scratches produced during their use. A pronounced wick effect is experienced with articles from the prior art compositions which effect causes marked discoloration adjacent to the porous edges of the articles. Because of these excellent physical properties, the heat- and pressure-consolidated resinous articles have ideal applications in dinnerware, i.e., flatware including cups, saucers, plates and the like and in laminated table, bar and counter tops.

2. Description of the Prior Art

Copolymers of diallyl carbonate with, for example, diallyl phthalate are known in the prior art; see U.S. Pat. No. 2,514,354. Such copolymers have been found to be acid and alkali resistant and have lower brittleness than diallyl carbonate homopolymers, permitting their use as interior coatings for storing fruits, juices, and the like. However, such copolymers do not have the combination of properties of the compositions of the present invention. In addition, these copolymers have been found to be very costly due to the necessity for employing both types of expensive monomers, i.e., diallyl carbonate and diallyl phthalate, to achieve the desired physical properties.

Certain fillers, such as powdered alpha cellulose, have been added to molding compositions consisting of, e.g., ethylene glycol bis (alkyl carbonate), to yield translucent products which though strong have not been found suitable to withstand the severe conditions required for dinnerware; see U.S. Pat. No. 2,403,112. In addition, such prior art compositions were not found to have the excellent resistance to staining possessed by the present compositions.

Melamine-formaldehyde resins have experienced widespread use in molded articles such as dinnerware. However, one of the major disadvantages of such resins is their susceptibility to the various kinds of stains from coffee and the like as discussed above. Attempts to modify the melamine-type resins to make them resistant to staining have also required rather costly components; see U.S. Pat. No. 3,367,917.

SUMMARY

The compositions of the present invention which when converted to molded articles have very high flexural strength, tensile strength and hardness and have greatly improved stain resistance and impact resistance when compared to the prior art compositions.

An object of the present invention is to provide filled compositions of diallyl carbonate that have improved physical properties over the prior art compositions. Another object of this invention is to provide relatively low-cost filled diallyl carbonate compositions which have outstanding physical properties suitable for use in dinnerware.

The present invention provides a composition of matter comprising an intimate blend of at least 35 weight percent of a polymer containing at least 50 weight percent of diallyl carbonate, and at least 25 percent of one or more reinforcing fillers. The reinforcing fillers comprise at least 10 weight percent of a primary filler and 0 to 40 weight percent of a secondary filler. The primary filler is selected from the group consisting of cellulose, glass and polyester fibers and mixtures thereof. The secondary filler is selected from the group consisting of clay, calcium carbonate, magnesium carbonate, silica powder and mixtures thereof. It is entirely unexpected that the particular combination of diallyl carbonate and reinforcing fillers would result in the improvement in strength properties and stain resistance over prior art polymers including diallyl carbonate polymers without the filler.

PREFERRED EMBODIMENTS OF THIS INVENTION

The composition of this invention preferably comprises an intimate blend of at least 40 weight percent of a reinforcing filler based on the weight of the composition and still more preferably fillers in an amount of about 50 to 65 percent with the balance being a polymer consisting of at least 50 weight percent diallyl carbonate. While the diallyl carbonate polymeric components of this invention can contain other comonomers such as diallyl phthalate, these other comonomers have been found to be unnecessary to achieve the desired improved results. Therefore, in the preferred compositions of this invention diallyl carbonate homopolymer is used.

The primary fillers that have been found to be especially effective in the compositions of this invention include alpha cellulose, milled glass fibers between 1/10 inch and ¼ inch in length, polyester flock sold under the registered trademark "Dacron" and mixtures of these primary fillers. They are intimately blended with the diallyl carbonate in amounts of about 10 to 40 percent based on the weight of the final composition.

The secondary fillers that have been particularly effective and are preferably blended into the composition of this invention include finely divided clay or calcium carbonate.

The preferred compositions of this invention have the following minimum physical properties.

| Properties | ASTM Test Method | Value |
| --- | --- | --- |
| Rockwell Hardness, on "M" Scale | D-785-62 | 100 |
| Flexural Strength, p.s.i. | D-790-63 | 7,500 |
| Flexural Modulus, p.s.i. | D-638-61T | 850,000 |
| Stain Resistance, Color Change | | less than 40* |

*expressed in $R_d$ units on a Gardner Color Difference Meter

A preferred composition of this invention especially suitable for dinnerware application consists of:

a. about 35 to 60 weight percent of diallyl carbonate homopolymer, b. about 10 to 40 weight percent of one or more of the primary fillers of the type described in this section above, and c. about 10 to 40 weight percent of finely divided clay, wherein the total of the (b) and (c) components are equal to at least 40 percent based on the weight of the final composition. This particular composition not only has been found to have at least the minimum strength properties listed in the preceding paragraph, but has been found to have a stain resistance of less than 15 expressed as a color change in $R_d$ units on the Gardner Color Difference Meter. Specific examples of these compositions and results therefrom are set forth in the Examples below.

One of the methods for preparing the diallyl carbonate monomer which is one of the alkyl esters and more specifically an allyl carbonate, comprises treating an excess of diethyl carbonate with allyl alcohol at reaction conditions to exchange the allyl radical of the alcohol for the ethyl radical of the carbonate illustrated by the following equation:

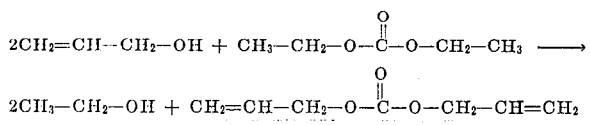

This reaction preferably is conducted in the presence of a catalyst such as the alcoholates of such alkali metals as sodium, potassium, lithium and the like and the lower alcohols such as methyl, ethyl, butyl, isobutyl and propyl alcohol. For a typical reaction about 1 mole of catalyst is employed for 100 moles of diethyl carbonate. Although solvents are not required to carry out the reaction, they may aid the process. Suitable solvents include benzene, hexene, dioxane, pentane and mixtures thereof. The preferred operating conditions include temperatures in the range of about 60° to 160° C. for a period of about 3 to 8 hours under a blanket of inert gas such as nitrogen. At the completion of the reaction the lower boiling alcohol is removed from the reactor by distillation. The diallyl carbonate monomer containing excess reactants, catalyst and the like can be purified by any suitable means. For additional details of this preparation reference can be made to U.S. Pat. No. 2,514,354.

Another method for preparing diallyl carbonate monomer comprises treating an excess of allyl chloroformate with allyl alcohol in the presence of an acid acceptor such as pyridine at reaction conditions to chemically exchange radicals as represented by the following equation:

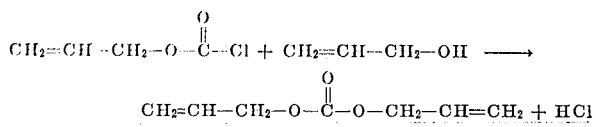

A specific example of the synthesis of the diallyl carbonate monomer and its subsequent prepolymerization is set forth in Example 1 below.

The diallyl carbonate monomer is prepolymerized in the presence of a suitable solvent such as dioxane with a suitable initiator, i.e., a peroxide initiator such as di-tertiary butyl perbenzoate, di-tertiary butyl peroxide, di-benzoyl peroxide, dilauroyl peroxide, cyclohexanone peroxide, tertiary-butyl hydroperoxide, di-acetyl peroxide, dibenzoyl peroxide, cumene hydroperoxide, dicumyl peroxide and the like, at a temperature of about 25° to 160° C. for a sufficient period of time to polymerize 10 to 50 weight percent, preferably 20 to 35 weight percent of the monomer to prepolymer. The resulting prepolymer product solution is then cooled and precipitated with a nonsolvent and the resulting product is separated from the liquid phase and dried.

The resulting prepolymer is dissolved in a suitable solvent such as acetone to which is added the desired filler, one or more of the peroxide initiators and a metallic stearate as a processing aid such as zinc, magnesium, calcium and sodium stearate. In addition to these components, other components which can be added to incorporate them into the compositions of this invention include pigments, delustrants, plasticizers, flame retardant materials and other materials known in the art to modify the chemical and physical properties of the finished filled diallyl carbonate compositions.

The mixture resulting from the combination of the above components is allowed to dry to remove the solvent. The resulting solid composition can then be ground or otherwise reduced into discrete particles and sold as a molding compound or molded into the desired articles.

The composition of the invention may be mixed in any suitable blending apparatus, such as a cone-type mixer, double-arm mixer or the like to provide intimate contact between the blending components.

The examples below illustrate the preparation of the composition of the present invention and the results obtained thereon.

EXAMPLES

EXAMPLE 1

This example illustrates the synthesis of diallyl carbonate monomer and its subsequent prepolymerization for use in the compositions of the examples below.

2.1 mols of allyl chloroformate were reacted in an agitated vessel with 2 mols of allyl alcohol in the presence of pyridine at 3° to 10° C. for a period of about 5 hours. The resulting diallyl carbonate was recovered from the vessel and washed, dried and distilled.

Sixteen grams of benzoyl peroxide were dissolved in 400 grams of 1,4-dioxane and 400 grams of the diallyl carbonate were added to the resulting solution. The reaction mixture was heated from 25° to 80° C. in 2 hours and maintained at 80°±5° C. for about 2 hours to prepolymerize about 30 percent by weight of the monomer. The product mixture was cooled to 30° C. and mixed with methanol at 0° C. to precipitate the diallyl carbonate prepolymer. The solid prepolymer was separated from the liquid phase and dried.

EXAMPLE 2

About 100 grams (about 66 percent based on the weight of the final composition) of the diallyl carbonate (DAC) prepolymer of Example 1 were dissolved in 150 grams of acetone. The following components were then added to the solution: 3 grams of $TiO_2$ pigment, 2 grams of zinc stearate to serve as a processing aid, 3 grams (about 1 percent based on the weight of the solution) of t-butyl perbenzoate, and 43 grams (about 29 percent based on the weight of the final composition) of alpha cellulose flock sold under the trade name "Solka Flock SW 40" and blended in a Hobart Mixer.

The resulting mixture was dried in a heated chamber for about 1½ hours to remove the acetone. The dried material was then further blended in a two-roll rubber mill for a period of about 5 minutes until it was well mixed. The resulting material was then broken into small pieces and compression molded under a pressure of 3,200 p.s.i.g. Compression-molded samples, prepared by placing the material in the molds and heating the material at 300° F. for 2.5, 4, 6 and 8 minutes, respectively, were found to have average Rockwell Hardness values on the "M" Scale in the range of 105–111. In addition, cups were molded from the composition of this Example and measured for coffee stain resistance. The coffee stain resistance test comprised placing samples of the moldings in a bath of coffee containing 98 grams of fresh coffee grounds per 7,000 ml. $H_2O$ at 180° F. for a period of 48 hours. The degree of staining was measured by determining the color of the samples before and after exposure to the coffee bath with a Gardner Color Difference Meter. The cups from the composition of the Example were found to be much more resistant to coffee staining than cups molded from standard melamine-formaldehyde resin.

EXAMPLE 3

This example illustrates the effect of variations in the t-butyl perbenzoate concentrations during the thermoset polymerization of the composition of this invention.

The same procedure followed in Example 2 was followed in this Example with the formulations set forth in Table I:

TABLE I

| Components | Run 1 | | Run 2 | | Run 3 | | Run 4 | |
| --- | --- | --- | --- | --- | --- | --- | --- | --- |
| DAC prepolymer,[1] grams | 50 | ([2] 72.2%) | 40.0 | ([2] 70.6%) | 38.0 | ([2] 72.2%) | 38.0 | ([2] 70.2%) |
| Acetone, grams | 55 | | 40.0 | | 38.0 | | 38.0 | |
| TiO$_2$, grams | 1.5 | | 1.2 | | 1.14 | | 1.14 | |
| Zinc stearate, grams | 1.0 | | 0.8 | | 0.76 | | 0.76 | |
| t-Butyl perbenzoate, grams | 0 | | 1.2 | ([3] 1.24%) | 0.76 | ([3] 0.83%) | 1.52 | ([3] 1.65%) |
| Alpha cellulose, grams | 16.7 | ([2] 24.2%) | 13.4 | ([2] 23.7%) | 12.7 | ([2] 23.8%) | 12.7 | ([2] 23.4%) |
| Total | 124.2 | | 96.6 | | 91.36 | | 92.12 | |

[1] Prepared by the procedure of Example 1.
[2] Based on weight of final composition.
[3] Based on weight of solution.

Compression molded samples after mold times of 2, 4, 6, 8 and 10 minutes at 300° F. for Runs 1, 2, 3 and 4 were found to have average Rockwell Hardness values on the "M" Scale in the ranges indicated in the Table II below:

TABLE II

| Run | Range of Rockwell Hardness on "M" Scale |
| --- | --- |
| 1 | 61–72 |
| 2 | 101–107 |
| 3 | 97–102 |
| 4 | 102–104 |

Two-inch molded discs from each of the molded samples of the compositions of Example 3 were cut in half and suspended in a 1 percent aqueous solution of Alconox detergent. The temperature of the Alconox bath was maintained at 180° F. Random checks were made at 24-hour intervals to observe breakage and water uptake. After 115 hours all of the samples were removed from the bath and were examined to show that no softening had taken place. A new 1 percent aqueous solution was prepared and the test continued. After a total of 12 days the samples were again removed and their weight measured and compared with their initial weights. The percent increase in weight of each of these samples were measured and a range of this increase for samples at the mold times given above are indicated in Table III below:

TABLE III

| HYDROLYTIC STABILITY | |
| --- | --- |
| Run | Range of % Increase in Weight |
| 1 | 2.48–2.63 |
| 2 | 2.99–3.24 |
| 3 | 3.34–3.58 |
| 4 | 3.19–3.40 |

EXAMPLE 4

This example illustrates more clearly the improvement in the stain resistance of the composition of the present invention when compared with standard grades of melamine-formaldehyde resins.

The same procedure followed in Example 2 was followed in this example except that the following formulation in grams was employed:

| COMPONENTS | RUN 5 | |
| --- | --- | --- |
| DAC prepolymer** | 40 | (40.1%)* |
| DAC monomer** | 5 | |
| Acetone | 75 | |
| t-butyl perbenzoate | 1.35 | |
| TiO$_2$ | 2.25 | |
| Zinc stearate | 0.5 | |
| Clay*** | 33.7 | (33.8%)* |
| Glass fiber,**** | 16.83 | (16.9%)* |
| | 174.63 | |

Notes: *Based on the weight of the final composition

**Prepared by the procedure of Example 1

***An aluminum silicate pigment clay having an average particle size of about 5 microns and sold under the trade name "Clay ASP 400"

****⅛-inch milled glass fibers (E Glass)

The compression molded samples of this example were found to have an average Rockwell Hardness in the range of 100 and 104 on the "M" Scale.

Specimens of the compression moldings from the composition of this example were immersed in coffee containing two teaspoons per cup at 180° F. for 48 hours and resulted in a final color change of 8.7, expressed in $R_d$ units which measures whiteness, from the specimen's initial color as measured by a Gardner Color Difference Meter as compared to an $R_d$ color change of about 43 for standard melamine-formaldehyde resins.

EXAMPLE 5

This example illustrates the results obtained on varying the type of filler used in the compositions of the present invention. The formulations of Table IV below were prepared in accordance with the procedure of Example 2:

TABLE IV

| Components | Run 6 | | Run 7 | | Run 8 | |
| --- | --- | --- | --- | --- | --- | --- |
| DAC prepolymer [1], grams | 35.0 | ([2] 45.9%) | 34.0 | ([2] 44.1) | 34.0 | ([2] 37.9%) |
| Acetone, grams | 75.0 | | 75.0 | | 75.0 | |
| Zinc stearate, grams | 0.4 | | 0.4 | | 0.4 | |
| TiO$_2$, grams | 1.8 | | 3.6 | | 3.6 | |
| t-Butyl perbenzoate, grams | 1.05 | | 1.05 | | 1.1 | |
| Clay [3], grams | 25.4 | ([2] 33.3%) | 0 | | 0 | |
| Calcium carbonate, grams | 0 | | 25.4 | ([2] 32.9%) | 25.4 | ([2] 28.3%) |
| Alpha cellulose, grams | 12.7 | ([2] 16.7%) | 12.7 | ([2] 16.5%) | 12.7 | ([2] 14.16%) |
| Glass fiber [4] | 0 | | 0 | | 12.7 | ([2] 14.16%) |
| Total | 151.35 | | 152.15 | | 164.9 | |

[1] Prepared by procedure of Example 1.
[2] Based on the weight of the final composition.
[3] "Clay ASP 400."
[4] ⅛" milled glass (E glass).

The range of average Rockwell Hardness values for the molded samples at mold times of 2, 4, 6 and 8 minutes, respectively, are set forth in the Table below:

TABLE V

| RUN | Range of Rockwell Hardness on "M" Scale |
| --- | --- |
| 6 | 90–99 |
| 7 | 109–112 |
| 8 | 107–111 |

Compression molded samples of compositions of Example 5 at 6-minute mold times were placed in a coffee bath containing 98 grams of coffee in 7,000 ml. of water at a temperature of 180° F. for 48 hours and the color of the moldings was determined before and after exposure to the coffee with the Gardner Color Difference Meter. The coffee stain resistance of the samples are given in Table VI below:

TABLE VI

| RUN | Color Difference, $R_d$ |
| --- | --- |
| 6 | 11.1 |
| 7 | 25.9 |
| 8 | 31.4 |

The results of this example further illustrate that excellent color resistance and hardness can be obtained by the compositions of this invention.

EXAMPLE 6

This example shows a more complete breakdown of the strength properties of the compositions of this invention. The following formulation in grams was prepared.

| COMPONENTS | RUN 9 | |
| --- | --- | --- |
| DAC prepolymer* | 51 | (42.0%)** |
| Acetone | 65 | |
| Zinc stearate | 0.6 | |
| $TiO_2$ | 10.8 | |
| t-butyl perbenzoate | 1.53 | |
| Alpha cellulose | 19.1 | (15.76%)** |
| Calcium | | (31.4%)** |

*Prepared by procedure of Example 1

**Based on the weight of the final composition

The procedure followed to obtain the composition of this example comprised dissolving the prepolymer in the acetone and then adding to the mixture the t-butyl perbenzoate and thoroughly mixing the solution. The solution was then introduced into an Atlantic Research twin-cone mixer and the zinc stearate, $TiO_2$ and calcium carbonate were added. The mixture was then stirred for about 5 minutes and the alpha cellulose was added followed by continuous mixing for an additional 10 minutes. The acetone was partially evaporated by warming the mixture slightly above room temperature and passing nitrogen over the mixture. The resulting composition was extruded into a Pyrex baking dish and allowed to dry overnight. The composition was then ground into a powder. A 5 inch × 8 inch × 18 inch sheet was molded from the powder using a platten temperature of about 305° F. and a pressure of about 100,000 pounds for a mold time of 4 minutes. 1 inch × ½ inch wide strips were cut from the sheet and the following results were obtained:

| Average flexural strength | 9,320 p.s.i. |
| --- | --- |
| Average flexural modulus ×10⁶ | 1.0 p.s.i. |
| Average Rockwell hardness on the "M" Scale | 111 |
| Average Izod impact strength | 0.24 ft.lbs./in. notch |
| Coffee stain resistance, $R_d$ | 31* |

*Expressed as a differential between the initial and final color based on the same procedure discussed in Example 5 above.

EXAMPLE 7

This example illustrates the use of polyester fiber as one of the fillers in the composition of this invention. The following formulation was prepared by the procedure of Example 6.

| COMPONENTS | RUN 10 | |
| --- | --- | --- |
| DAC prepolymer* | 67.5 | (37.0%)** |
| DAC monomer* | 7.5 | (4.1%)** |
| Acetone | 75 | |
| Zinc stearate | 1.0 | |
| $TiO_2$ | 15.0 | |
| t-butyl perbenzoate | 1.125 | |
| Calcium carbonate | 60.0 | (32.9%)** |
| Dacron polyester flock | 30.0 | (16.45%)** |
| Total: | 257.125 | |

*Prepared by procedure of Example 1

**Based on the weight of the final composition

The resulting mixture was placed on a baking dish to dry and the compound was then ground into powder. Discs of ¼ inch × 2 inch diameter were molded from the powder at about 300° F. and at 3,100 p.s.i.g. for a mold time of 4 minutes. The physical properties of the moldings of Run 10 of this invention were compared with moldings of commercial melamine-type resins in Table VII below:

TABLE VII

| | Commercial Melamine-Type Resin | RUN 10 |
| --- | --- | --- |
| Average Rockwell Hardness on the "M" Scale | 120 | 114 |
| Average Izod Impact Strength, ft.lbs./in. notch | 0.25 | 0.53 |
| Average Flexural Strength, p.s.i. | 14,800 | 8,200 |
| Average Flexural Modulus 10⁶, p.s.i. | 1.32 | 0.86 |

The coffee stain resistance of the above two samples were determined by the same procedure under Example 5 above. The composition of Run 10 was found to have greater stain resistance on visual inspection than the commercial melamine-type resin. This was especially noticeable on the cut edges which shows the improved wick effect of the compositions of this invention over prior art compositions.

The foregoing examples have shown the unexpected improvement in the stain resistance of the compositions of the present invention when compared with standard commercial grades of melamine-formaldehyde resins. In addition, the strength properties for the present compositions are on the same high level of melamine-type resins which make them ideally suited for dinnerware applications.

Resort can be had to modifications and equivalents within the spirit of the invention and the scope of the appended claims.

What is claimed is:

1. As an article of manufacture, dinnerware comprising an intimate blend of the following components:
   a. about 35 to 60 weight percent of a homopolymer of diallyl carbonate,
   b. about 10 to 40 weight percent of a primary filler selected from the group consisting of alpha cellulose, glass fibers, polyester fibers and mixtures thereof, and
   c. about 10 to 40 weight percent of a secondary filler selected from the group consisting of finely divided clay, calcium carbonate, and mixtures thereof, the total of said components (b) and (c) being equal to at least 40 weight percent based on the weight of the final composition, the final composition having the following minimum physical properties: A Rockwell Hardness on the "M" Scale based on ASTM D-785-62 of 100, a flexural strength based on ASTM D-790-63 of 7,500 p.s.i., a flexural modulus based on ASTM D-638-61T of 850,000 p.s.i. and a stain resistance of less than 40 expressed in $R_d$ units on a Gardner Color Difference Meter.

2. The article of claim 1 wherein said component (c) comprises finely divided clay.

3. The article of claim 1 wherein said component (c) comprises finely divided calcium carbonate.

4. As an article of manufacture, dinnerware comprising an intimate blend of the following components:
- a. about 35 to 60 weight percent of a homopolymer of diallyl carbonate,
- b. about 10 to 40 weight percent of a primary filler selected from the group consisting of alpha cellulose, glass fibers, polyester fibers, and mixtures thereof, and
- c. about 10 to 40 weight percent of finely divided clay, the total of said components (b) and (c) being equal to at least 40 percent based on the weight of the final composition, the final composition having the following minimum physical properties: a Rockwell Hardness on the "M" Scale based on ASTM D-785-62 of 100, a flexural strength based on ASTM D-790-63 of 7,500 p.s.i., a flexural modulus based on ASTM D-638-61T of 850,000 p.s.i. and a stain resistance of less than 15 expressed in $R_d$ units on a Gardner Color Difference Meter.

5. A composition of matter comprising an intimate blend of the following components:
- a. about 35 to 60 weight percent of a homopolymer of diallyl carbonate,
- b. about 10 to 40 weight percent of a primary filler selected from the group consisting of alpha cellulose, glass fibers, polyester fibers and mixtures thereof, and
- c. about 10 to 40 weight percent of a secondary filler selected from the group consisting of finely divided clay, calcium carbonate and mixtures thereof, the total of said components (b) and (c) being equal to at least 40 weight percent based on the weight of the final composition, the final composition having the following minimum physical properties: a Rockwell Hardness on the "M" Scale based On ASTM D-785-62 of 100, a flexural strength based on ASTM D-790- of 7,500 p.s.i., a flexural modulus based on ASTM D-638-61T of 850,000 p.s.i. and a stain resistance of less than 40 expressed in $R_d$ units on a Gardner Color Difference Meter.

6. The composition of claim 5 wherein said component (c) comprises finely divided clay in an amount of about 10–40 percent by weight of said composition.

* * * * *